(12) United States Patent
Manduley

(10) Patent No.: US 6,550,994 B2
(45) Date of Patent: Apr. 22, 2003

(54) SYSTEM FOR PRINTING INFORMATION ON A MAILING MEDIUM

(75) Inventor: Flavio M. Manduley, Woodbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 8 days.

(21) Appl. No.: 09/909,522

(22) Filed: Jul. 20, 2001

(65) Prior Publication Data

US 2003/0016986 A1 Jan. 23, 2003

(51) Int. Cl.⁷ .......................... B41J 15/24; B41L 47/46
(52) U.S. Cl. ....................................... 400/611; 101/91
(58) Field of Search ............................ 400/611, 139, 400/23, 82, 104, 121, 124; 270/1.1, 32, 4, 45; 101/91, 92, 93, 47; 347/9, 14, 22

(56) References Cited

U.S. PATENT DOCUMENTS

| | | | | |
|---|---|---|---|---|
| 5,184,900 A | * | 2/1993 | Eisner et al. .................. 400/82 |
| 5,437,441 A | * | 8/1995 | Tuhro et al. .................. 270/1.1 |
| 5,650,934 A | * | 7/1997 | Manduley .............. 364/478.08 |
| 5,684,706 A | | 11/1997 | Harman et al. ......... 364/464.16 |
| 5,730,049 A | | 3/1998 | Broschart .................... 101/91 |
| 5,787,558 A | | 8/1998 | Murphy ..................... 29/25.35 |
| 5,806,994 A | | 9/1998 | Coffy et al. ........... 400/120.01 |
| 5,813,326 A | | 9/1998 | Salomon ...................... 101/93 |
| 5,815,172 A | | 9/1998 | Moh ........................... 374/14 |
| 5,838,346 A | | 11/1998 | Stemmle, Sr. ............... 347/37 |

* cited by examiner

Primary Examiner—Raquel Yvette Gordon
Assistant Examiner—An H. Do
(74) Attorney, Agent, or Firm—Thomas F. Presson; Charles R. Malandra, Jr.; Angelo N. Chaclas

(57) ABSTRACT

A method and apparatus for printing information, such as postal indicia and other information, on a medium. The system is implemented by detecting a type of medium and entering a printing mode as a function of the type of medium detected. The printing mode is either an envelope printing mode or a tape/label printing mode. When in the envelope printing mode, a print module is positioned at a first position, and prints postal indicia data on a first area of the envelope. The print module is then positioned at a second position. Additional data is obtained and the additional data is printed on a second area of the envelope. The print module is then positioned at a third position and recipient address data is obtained and printed on a third area of the envelope. The print module is positioned at a fourth position, and sender address information is obtained and printed on a fourth area of the envelope.

35 Claims, 8 Drawing Sheets

SYSTEM FOR PRINTING INFORMATION ON A MAILING MEDIUM

FIELD OF THE INVENTION

This invention relates generally to printing information on a mailing medium. More particularly, this invention relates to control circuitry for a printing mechanism used in a value dispensing device, such as a postage meter, which accurately controls the printing mechanism so that postal indicia and other information are printed on a print medium suitable for mailing, such as an envelope, a label or a tape.

BACKGROUND OF THE INVENTION

Mailing machines for printing postage indicia on envelopes and other forms of mail pieces have enjoyed commercial success, both in the U.S. Postal Service and in industry mail rooms and private office environments. Generally speaking, there are many different types of mailing machines, ranging from relatively small units, which handle only one mail piece at a time to large, multi-functional units, which can separate, feed, weigh, print postage indicia on and stack hundreds of mail pieces per hour in a continuous stream operation. Thus, the modern mailing machine plays an important role in facilitating the rapid and Efficient movement and other handling of mail.

Mailing machines have traditionally been capable of printing postage indicia either directly on mail pieces, or on pieces of tape, which are then attached to mail pieces. Typically, the mailing machine is set to print the postage indicia on envelopes as they are fed seriatim along a feed deck by a suitable feeding mechanism, the printing operation being carried out by a printing device that is part of a postage meter component of the mailing machine. The postage meter component has various control devices by which it can be set to print a predetermined amount of postage, together with other settable information, such as a date, within a pre-set design, the selectable information and the pre-set design all constituting the aforementioned postage indicia.

Regardless of which type of printing device is utilized in the postage meter, it is often necessary to print the postage indicia on a strip of tape, either gummed or adhesive backed, because it is not possible to feed the mail piece on which it is desired to apply a postage indicia through the mailing machine. In many situations, for example, the mail piece may be to thick to be fed through the normal feeding path of the mailing machine, or it may be too large in area, or it may contain delicate material that could be damaged by the pressure exerted by the printing device of the postage meter. For whatever, reason, there are numerous occasions in the normal operating situations of a mailing machine, where the postage indicia simply cannot be applied directly to the mail piece and must be applied to a strip of tape which is then suitably adhered to the mail piece.

Digital printing technology includes thermal ink jet (bubble jet), piezoelectric ink jet, thermal printing techniques, and LED and laser xerographic printing that all operate to produce images by dot-matrix printing. In dot-matrix ink jet printing individual print elements in the printhead (such as resistors or piezo electric elements) are either electronically stimulated or not stimulated to expel or not expel respectively, drops of ink from a reservoir onto a substrate. Thus, by controlling the timing of the energizing of each of the individual print elements in conjunction with the relative movement between the printhead and the mailpiece, a dot-matrix pattern is produced in the visual form of the desired indicia.

Conventional printheads that are used to print information on a medium suitable for mailing, such as an envelope or adhesive tape, which is affixed to an envelope, print postal indicia as the medium passes through an apparatus. One drawback to this is that the printhead is not able to print additional data on the medium as the medium is passed through the printhead.

One technique for controlling energizing of ink jet printheads is disclosed in U.S. Pat. No. 5,815,172, issued Sep. 28, 1998 to Moh, entitled, "Method And Structure for Controlling the Energizing of an Ink Jet Printhead in a Value Dispensing Device such as a Postage Meter". This patent is hereby incorporated by reference in its entirety herein. While the technique described in that patent is useful to generate encoder pulses to a motor to activate the motor and to move the printhead at a desired speed over a medium, it does not attempt to enable the printhead to print on a plurality of areas of an envelope or tape.

U.S. Pat. No. 5,184,900, issued Feb. 9, 1993 to Eisner et al., entitled, "Envelope Addressing System Adapted to Simultaneously Print Addressees and Bar Codes". This patent relates to using one printhead for each address line, i.e., four lines would require four printheads. The printheads are mounted so at least two of the printheads overlap each other, which means that the printheads are positioned so that they are not in sequence with the numbers of the lines being printed. Transport rolls are mounted at either end of the printhead with no other transport rollers or transporting structures between the printheads. An electronic controller varies the time each of the printheads starts to print to correspond to the spacing of that printhead so that all of the lines may be printed with an aligned margin. This system does not enable a printhead to print various information on a plurality of areas of a medium.

U.S. Pat. No. 5,437,441, issued Aug. 1, 1995, to Tuhro et al., entitled, "Mail Preparation Copier With Mailing Address Identifications" relates to a digital copier with mail preparation functions. These functions include a document input scanner that derives an electronic representation of an original document and a document editor that is responsive to operator commands input from a user interface. A source of sheets and envelopes are fed to the printer. The printer is controlled to create an image on the selected sheet or envelope according to the created envelope image. Postage amount is generated in response to received information about the weight of a document. A document creator combines the image from an identified area with a pre-stored envelope image. This system, however, does not control a printhead to enable either a tape or an envelope to be printed, which includes postage indicia and additional information.

What is needed is an improved method and apparatus that permits a print module to print postal indicia and other information by moving the position of the print module and thereby achieve improved usage of the medium.

SUMMARY OF THE INVENTION

The present invention provides an improved method and apparatus for printing information, such as postal indicia and other information, on a medium.

Accordingly, one embodiment is directed to a method of printing on a medium. This method includes detecting a type of medium and entering a printing mode as a function of the type of medium detected in the detecting step. The printing mode is either an envelope printing mode or a tape/label printing mode. When in the envelope printing mode, a print module is positioned at a first position, and prints postal indicia data on a first area of the envelope. The print module is then positioned at a second position. Additional data is obtained and the additional data is printed on a second area of the envelope. This additional data, which could be virtually any information that would fit on the medium, typically includes slogan information, change of address information, delivery instructions and the like. The print module is then positioned at a third position and recipient address data is obtained and printed on a third area of the envelope.

Next, the print module is positioned at a fourth position, and sender address information is obtained and printed on a fourth area of the envelope.

It is another embodiment of the present invention that when in the tape printing mode, the print module is positioned at a fifth position, and indicia is printed on a first portion of the tape. The multiple printing positions on the tape are only constrained by the dimensions of the tape itself.

It is yet another embodiment of the present invention that the print module is positioned at a sixth position and additional tape information is obtained and printed on a second portion of the tape.

Yet another embodiment of the invention is directed to a method of printing on a medium, such as an envelope. This method includes a first positioning step of positioning a print module at a first position. Next, postal indicia information is printed on a first area of the medium. A second positioning step positions the print module at a second position and during a second printing step, a second type of information is printed on a second area of the medium.

Yet another embodiment of the present invention includes a third positioning step of positioning the print module at a position, which may be the same position as the first position. A third printing step prints a third type of information on a third area of the envelope.

Yet another embodiment of the present invention includes a fourth positioning step of positioning the print module at a fourth position, and a fourth printing step of printing a fourth type of information at a fourth area of the envelope.

Yet another embodiment of the present invention includes positioning a second print module on an opposite side of the envelope from the first position, and printing information on the opposite side of the envelope.

Yet another embodiment of the present invention includes a tapepositioning step of positioning the print module at a tape-printing position and printing indicia on a tape.

Yet another embodiment of the present invention includes a second tape-positioning step of positioning the print module at a second-tape printing position, and printing additional data on the tape.

Yet another embodiment of the present invention includes a third-tape positioning step of positioning the print module at a third tape printing position, and printing return address data on the tape.

Yet another embodiment of the present invention is directed to a method of printing on a medium that has an adhesive surface. The method includes a first positioning step of positioning a print module at a first position. Next a first printing step prints postal indicia on a first area of the medium. A second positioning step positions the print module at a second position, and a second printing step prints second information on a second area of the medium.

Yet another embodiment of the present invention includes a third positioning step of positioning a print module at a third position, and a third printing step of printing third information on a third area of the medium.

Yet another embodiment of the present invention relates to an apparatus for printing on a medium. The apparatus includes a first support member adapted to support a first medium and a second support member adapted to support a second medium;

A detection module detects one of the first medium or the second medium and a print module is adapted to print data on the detected medium.

When the detection module detects the first medium, the print module is disposed in a first position to print postal indicia data on a first area of the first medium, and the print module is then positioned in a second position to print second data on a second area of the first medium.

Yet another embodiment of the present invention includes a second print module positioned on an opposite side of the envelope from the first position. The second print module prints information on the opposite side of the envelope.

Yet another embodiment of the present invention is that the detection module determines information printed on the medium, and the print module prints information on the medium according to the determination of the detection module.

Yet another embodiment of the present invention is directed to a method of printing on a medium. The method includes determining a type of medium and determining dimensions of the medium. A first positioning step positions a print module at a first position and a first printing step prints postal indicia information on a first area of the medium. When the dimensions of the medium exceed a first threshold, a second positioning step positions the print module at a second position, and a second printing step prints second information on a second area of the medium.

When the dimensions of the medium exceed a second threshold, which is larger than the first threshold, a third positioning step positions the print module at a third position and a third printing step prints third information on a third area of the medium.

Yet another embodiment of the invention includes detecting the presence or absence of data, such as a destination address, or a sender's address, on the medium, and positioning the print module as a function of the detection.

Yet another embodiment is directed to an apparatus for printing on a medium. The apparatus includes means for detecting a type of medium. This means includes a sensor, switch or detector that establishes whether a tape, envelope or label is to be printed. When a first type of medium is detected, means for positioning a print module at a first position position the print module at the first position. The positioning means can be a portion of a print module controlled by a controller, which receives command data from a user or memory. The apparatus also includes means for printing postal indicia data on a first area of the envelope (the print means are suitably any print head as described herein) and means for positioning the print module at a second position. The apparatus also includes means for obtaining additional data and means for printing the additional data on a second area of the envelope. This is achieved by retrieving additional data from a memory or a user interface and printing the data using a printing device. The apparatus also includes means for positioning the print module at a third position and means for obtaining recipient address content data. These means are suitably similar to the means described above, specifically, a processor controlled apparatus to position a print module and a memory for storing recipient data, which is down loaded and printed by the print module. The apparatus also has means for printing the recipient address data on a third area of the envelope and means for positioning the print module at a fourth position. The apparatus also includes means for obtaining sender address information and means for printing the sender address information on a fourth area of the envelope.

Yet another embodiment of the invention is that when a second type of medium is detected, means for positioning the print module at a fifth position, and means for printing indicia on a first portion of the tape.

Yet another embodiment of the invention includes means for positioning the print module at a sixth position, means for obtaining additional tape information, and means for printing the additional tape information on a second portion of the tape.

Yet another embodiment of the present invention is directed to an apparatus for printing on an envelope. The apparatus includes means for positioning a print module at a first position, means for printing postal indicia information on a first area of the envelope, means for positioning the print module at a second position, and means for printing a second type of information on a second area of the envelope.

Yet another embodiment of the present invention includes means for positioning the print module at a third position, and means for printing a third type of information on a third area of the envelope.

Yet another embodiment of the present invention includes means for positioning the print module at a fourth position, and means for printing a fourth type of information at a fourth are a of the envelope.

Yet another embodiment of the present invention includes means for positioning a second print module on an opposite side of the envelope from the first position, and means for printing information on the opposite side of the envelope.

Yet another embodiment of the present invention includes means for positioning the print module at a tape-printing position and means for printing indicia on a tape.

Yet another embodiment of the present invention is directed to an apparatus for printing on a medium that has an adhesive surface. The apparatus includes means for positioning a print module at a first position, means for printing postal indicia on a first area of the medium, means for positioning the print module at a second position, and means for printing second information on a second area of the medium.

Yet another embodiment of the present invention is directed to an apparatus for printing on a medium. The apparatus includes means for determining a type of medium, means for determining dimensions of the medium, means for positioning a print module at a first position, means for printing postal indicia information on a first area of the medium. When the dimensions of the medium exceed a first threshold, means for positioning the print module at a second position, and means for printing second information on a second area of the medium.

When the dimensions of the medium exceed a second threshold, the second threshold being larger than the first threshold, means for positioning the print module at a third position, and means for printing third information on a third area of the medium.

Yet another embodiment of the invention includes means for detecting the presence or absence of a destination address on the medium, and means for positioning the print module as a function of the detection.

Yet another embodiment of the invention is directed to an apparatus for printing on a medium. The apparatus includes a support member adapted to support a medium, a print module positioned to print on a medium while the medium is disposed on the support member and a processor, operatively connected to the print module, adapted to provide control instructions to the print module such that the print module prints postal indicia on a first area of the medium, additional information on a second area of the medium and recipient address information on a third area of the medium.

Yet another Embodiment of the present invention is directed to a method and apparatus downloading information to a peripheral mailing machine, which includes a print module, a PC and an interface to a network, such as the Internet. The apparatus and corresponding method include sensing a type of medium that is to be printed on and positioning a print module at a first position based on the type of medium sensed in the sensing step. Next, postal indicia information is printed on the medium and the print module is positioned at a second position. Then, second information is printed on the medium, the second information retrieved from a remote location via a network.

DESCRIPTION OF THE DRAWINGS

The above and other aspects of the present invention will be apparent upon consideration of the following detailed description, taken in conjunction with accompanying drawings, in which like reference characters refer to like parts throughout, and in which.

DETAILED DESCRIPTION OF THE PRESENT INVENTION

The present invention enables a printer module to be positioned at numerous locations as a print medium, which is typically an envelope, mailing label or tape, is moving relative to the print module. The amount of information printed on the medium is a function of the available area of the medium, as well as any information that is on the medium prior to the printing process. Indicia, such as postal indicia and many types of additional data, such as slogan information, delivery instructions, contact information, mail stop information, message information, recipient's address information, sender's address information and the like can be printed on the medium. Generally speaking, additional information is any information that is printed on the medium in addition to the postal indicia.

Figure 1:
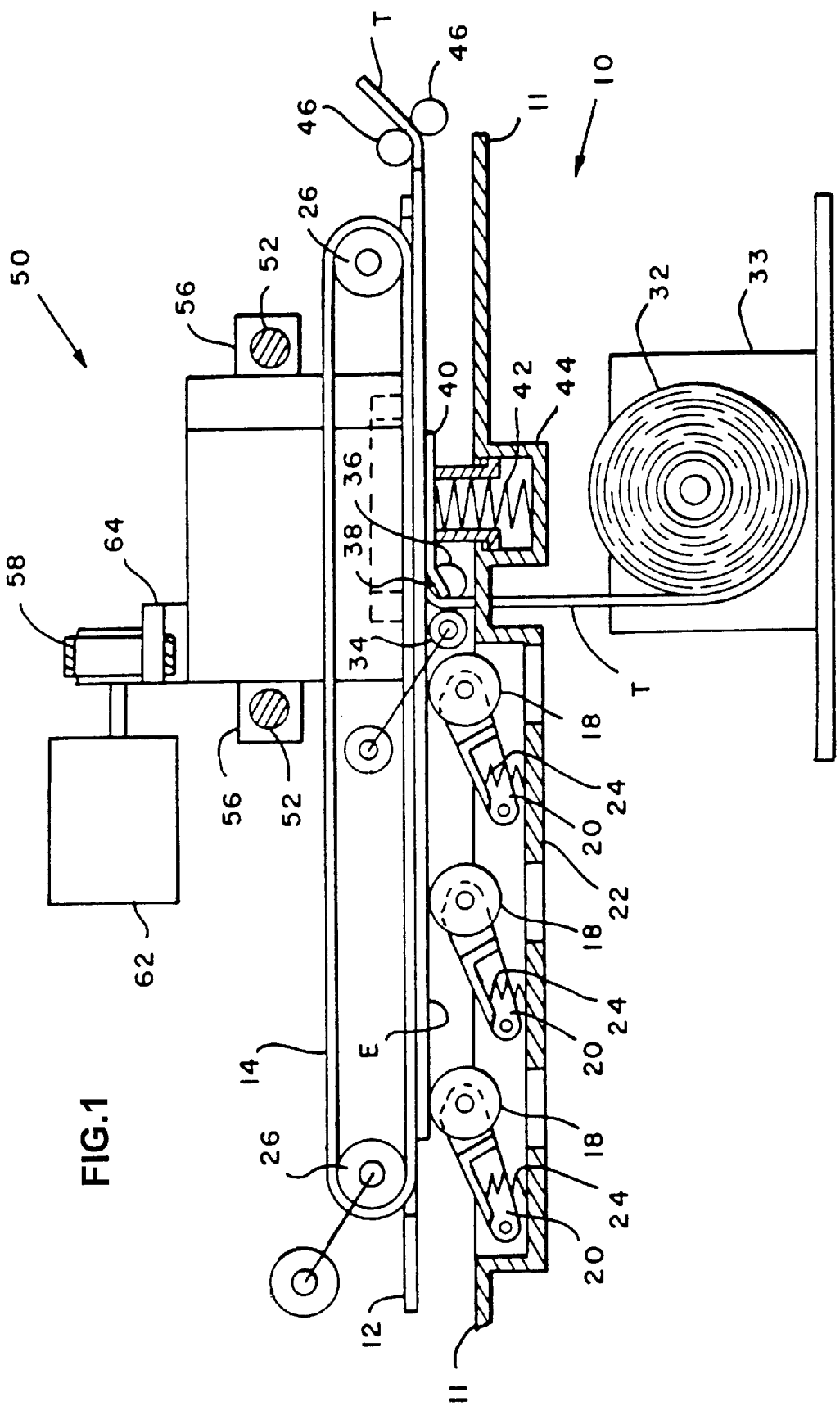
FIG. 1 is a front elevation of a representative mailing machine embodying the principles of the present invention.

FIG. 1 shows a representative mailing machine 10 embodying the principles of the present invention. Frame 11 suitably supports the components of the mailing machine 10, including an elongate guide plate 12 which extends through the mailing machine 10, the underside of which defines a printing plane for the upper surface of envelopes E, and in conjunction with an endless belt 14, a feed path along which the envelopes are fed. The envelopes E are fed along the feed path by the lower run of the belt 14 that projects through an elongate slot in the guide plate 12 so as to cooperate with a plurality of back up rollers 18. The rollers 18 are rotatably mounted on the free ends of arms 20 that are pivotally connected to a suitable housing 22 that is part of the frame 11, and are urged upwardly against the envelope E by suitable biasing means such as the springs 24. The belt 14 is supported by a pair of rollers 26, one of which is driven by a motor (not shown). There are typically two rows of back up rollers 18 so as to ensure that the envelope E is adequately supported and maintained flat against the underside of the guide plate 12.

A tape T of indefinite length is suitably stored in the mailing machine 10 on a roll 32 mounted in a housing 33 and is fed upwardly from the roll 32 by a pair of feed rollers 34 and 36, the roller 36 also serving to feed the tape T into a throat 38 defined by the underside of the guide plate 12 and the upper surface of a pressure plate 40 that is movably mounted to press the tape T against the underside of the guide plate 12 in response to a spring 42 captured between the pressure plate 40 and a suitable housing 44 formed in the frame 11. Another pair of feed rollers 46 draws the tape T through the mailing machine 10 and feeds individual lengths of tape to a retrieval location after they have been printed and severed from the strip. The feed roller pair 34 and 36 and the feed rollers 46 are suitably driven by a motor (not shown) suitably connected to both pairs of feed rollers. The location of the tape T and the path of movement thereof, as defined by the location of the pair of feed rollers 34 and 36, the pressure plate 40 and the feed rollers 46, is disposed in offset parallel relationship to the feed path for the envelope, so that the respective feed paths are separate from one another. It should be understood that the principles of the present invention are applicable to mailing machines which have the capability of weighing mail pieces while they are being transported through the mailing machines, so that appropriate postage can be selected in the postage meter component of such mailing machines for printing on each individual mail piece. In machines of this type, the entire envelope feed mechanism, including the guide plate 12, the belt 14, the rollers 26, the backup rollers 18 and the supporting structure therefor, and the housing 22 would all be mounted as a unit on a load cell, in a manner well known in the art, so that the weight of an envelope being fed through the mailing machine could be detected by the load cell and transmitted to a postage meter, again in a manner known in the art.

The mailing machine 10 includes a printing device, indicated generally by the reference numeral 50. The printing device 50 is mounted on a pair of spaced apart parallel rails 52 by means of suitable sliding brackets (not shown), the rails 52 being supported by fixed brackets 56 mounted on the frame 11 and extending in a direction perpendicular to the direction of feed of envelopes E and the tape T through the mailing machine 10. The printing device 50 is moved back and forth along the rails 52 by an endless belt supported on a pair of rollers (belt and rollers not shown). Reversible motor 62 drives at least one roller. The printing device 50 is connected to the belt 58 by a suitable bracket 64.

The printing device 50 is typically an ink jet printhead such as any of those mentioned above. This printing device 50 includes a nozzle plate having an array of very small nozzles through which small droplets of ink are ejected in a predetermined pattern under the control of suitable software so as to create a desired image on a receiving medium moving past the printing device 50. The data printed by the printing device 50 can be input by a user interface (shown in FIG. 2) or downloaded from a memory. The data can be associated in batches, such that particular recipient address data will be associated with particular sender address data. Thus, all mailing medium with a particular data can be grouped together. This is especially useful for invitations to an event such as a wedding in which some of the guests are invited by one party (bride's family) and other guests are invited by another party (groom's family). This way, the sender's address will be associated with particular recipients. This data can be provided by each party and thereby facilitate the mailing of invitations to the invitees.

Figure 2:
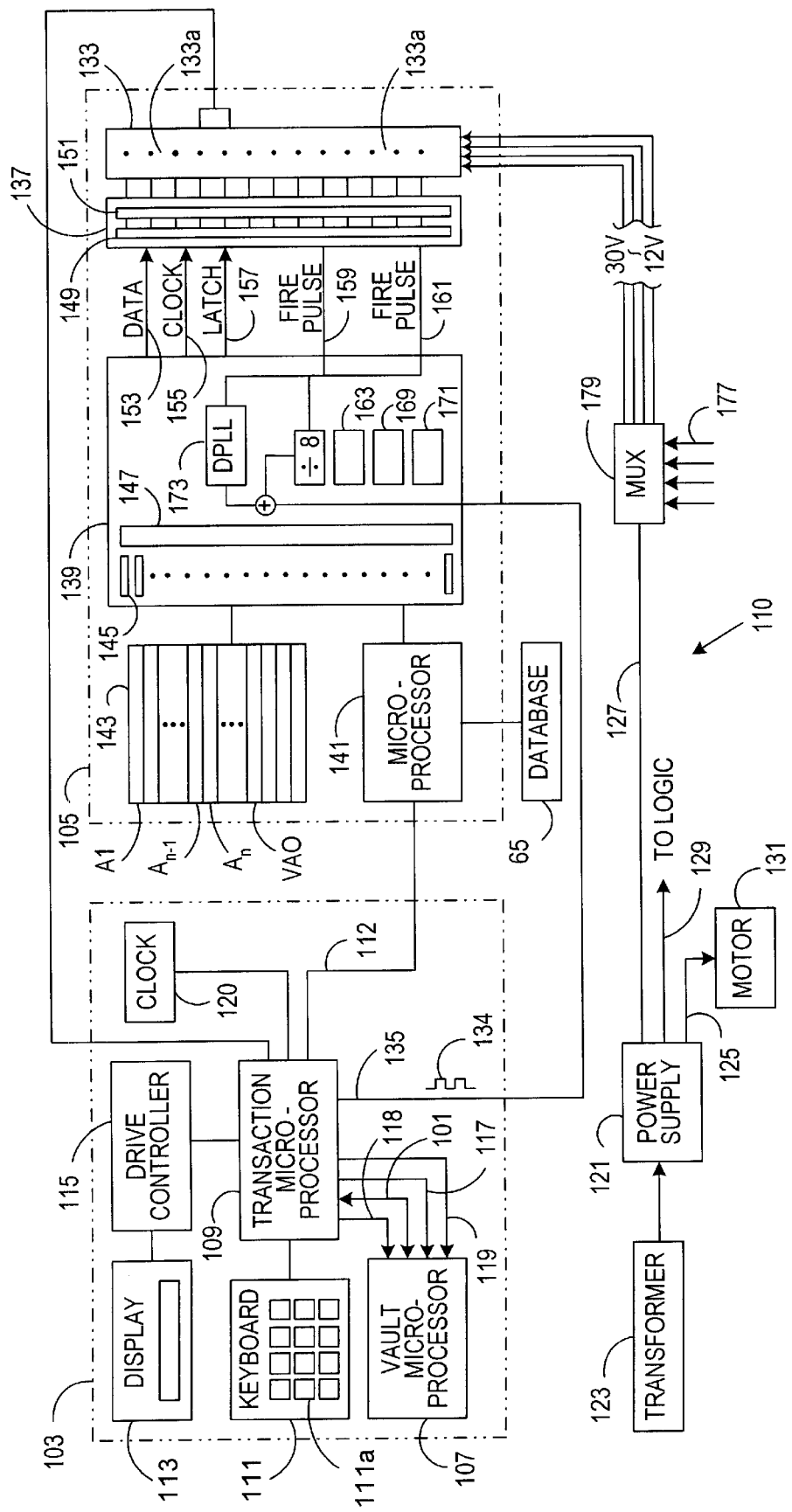
FIG. 2 is an electrical block diagram of control circuitry of the present invention, incorporated in a postage meter.

FIG. 2 shows an electrical block diagram of a postage meter 110 implementing the present invention. Postage meter 110 includes two primary modules, a base module 103 and a printhead module 105. Base module 103 includes a vault microprocessor 107 and a transaction microprocessor 109. Vault microprocessor 107 has software and associated memory to perform conventional accounting functions of postage meter 110. For example, vault microprocessor 107 has the capability to have downloaded therein a predetermined amount of postage funds. During each postage transaction, vault microprocessor 107 determines if sufficient funds are available. If sufficient funds are available, vault microprocessor 107 debits the amount from a descending register, adds the amount to an ascending register, and sends the postage amount to the print module, also referred to as print head herein, 105 via the transaction microprocessor 109. Transaction microprocessor 109 also sends date data to the printhead module 105 so that a complete indicia image can be printed on a medium.

Vault microprocessor 107 manages the postage funds with the ascending register representing the lifetime amount of postage funds spent, the descending register representing the amount of funds currently available, and a control sum register showing the running total amount of funds that have been credited to the vault microprocessor 107. Additional features of vault microprocessor 107 that can be included are a piece counter register, encryption algorithms for encoding the information sent to the printhead module 105, and software for requiring a user to input a personal identification number that must be verified by the vault microprocessor 107 prior to its authorizing a postage transaction.

Transaction microprocessor 109 coordinates and assists the transfer of information along bi-directional data lines 101 and 112 between the vault microprocessor 107 and the printhead module 105, respectively, as well as coordinating various support functions necessary to complete the metering function. Transaction microprocessor 109 interacts with keyboard 111 to transfer user information input through keyboard keys 111a (such as PIN number, postage amount) to the vault microprocessor 107. Additionally, transaction microprocessor 109 sends data to a liquid crystal display 113 via a driver/controller 115 for the purpose of displaying user inputs or for prompting the user for additional inputs. Moreover, transaction microprocessor 109 provides power, clock, and a reset signal to vault microprocessor 107 via respective lines 117, 118, and 119. A clock 120 provides date and time information to transaction microprocessor 109. Alternatively, clock 120 can be eliminated and the clock function can be accomplished by the transaction microprocessor 109.

Postage meter 110 also includes a conventional power supply 121 that conditions raw AC voltages from a wall mounted transformer 123 to provide the required regulated and unregulated DC voltages for the postage meter 110. Voltages are output via lines 125, 127, and 129 to respectively a printhead motor 131, printhead 133 (which is suitably a piezoelectric printhead, but may also be a laser printhead or an ink jet printhead) and all logic circuits. Motor 131 is used to control the movement of the printhead 133 relative to the mailpiece upon which indicia information and other information is to be printed. Base module 103, via transaction microprocessor 109, controls the supply of power to motor 131 to ensure the proper starting and stopping of printhead 133 movement after vault microprocessor 107 authorizes a postage transaction.

Memory module 65 is coupled to print module 105. Memory module 65 is suitably RAM or other computer memory with sufficient capacity to store information to be printed by the print module 105. This information includes slogan information, recipient address information, sender address information, postal rate information, license information and any other information that is printed on either an envelope, tape or mailing label.

Base module 103 also sends an encoder signal 134, via line 135, that correlates to the number of pulses sent by base microprocessor 103 to stepper printhead motor 131 so that the exact position of printhead 133 can be determined based on encoder signal 134. Encoder signal 134 is sent to printhead module 105 to synchronize the energizing of individual printhead elements 133a in printhead 133 with the positioning of printhead 133 by motor 131.

Printhead module 105 includes printhead 133, a printhead driver 137, an Application Specific Integiated Circuit (ASIC) 139, a microprocessor 141 and a non-volatile memory (NVM) 143. NVM 143 has stored therein image data of the fixed indicia and image data for each individual font that can be required as part of the variable data of a postage indicia to be printed by postage meter 110. Microprocessor 141 receives a print command, postage amount, and date via the transaction microprocessor 109. The postage amount and date are sent from microprocessor 141 to the ASIC 139 which then accesses non-volatile memory 143 (having addresses A1-VAO . . . ) to obtain image data therefrom which is then downloaded by ASIC 139 to the printhead driver 137 in order to energize individual printhead elements 133a to produce a single column dot pattern of the indicia. The individual column-by-column generation of the indicia is synchronized with movement of printhead 133 until the full indicia is produced. The column-by-column generation of the postage indicia includes use of the variable address registers 145–145h and buffer 147 of ASIC 139.

The control circuitry for printhead 133 will now be described in more detail. The printhead control circuitry primarily includes ASIC 139, driver chip 137 and printhead 133.

Driver chip 137 has a shift register 149 and a second register 151 contained therein. ASIC 139 has variable address registers 145–145h and buffer 147. ASIC 139 sends image data from buffer 147, via data line 153, in a serial manner to shift register 149 together with a clock signal via clock line 155. Buffer 147 contains a single column of image data which is downloaded into shift register 149. When ASIC 139 sends a latch signal, via line 157, the single column of image data contained in shift register 149 is latched into register 151 so that the next column of image data can be sent from ASIC 139 and downloaded into shift register 149. Subsequently, upon receipt of first and second fire pulse signals 159, 161, the even numbered and odd numbered nozzles 133a are respectively energized to deposit ink drops on a recording medium surface. That is, when fire pulse 159 is in an active state, the odd numbered nozzles (1, 3, 5, . . . ) are fired or not fired depending upon the corresponding bit value in register 151 associated therewith and when fire pulse 161 is in its active state the even numbered nozzles (2, 4, 6, . . . ) are fired or not fired depending upon the bit value contained in the corresponding address of register 151.

Register 163 is a programmable register, the value of which can be easily changed based on input by an operator via keyboard 111 and associated software contained in microprocessor 141. Registers 169 and 171 are used to store pulse widths and a time delay, respectively.

DPLL module 173 is coupled to base module 103 via line 135 and provides input to driver chip 137. MUX module 179 receives inputs, shown as lines 177 and 127 and outputs data to printhead 133.

Upon completion of the postal indicia printing process, the print module 105, including print head 133 is moved to a second position to print additional information on a second area of the medium. The print module can be moved repeatedly to print information on other areas of the medium.

Figure 3A:
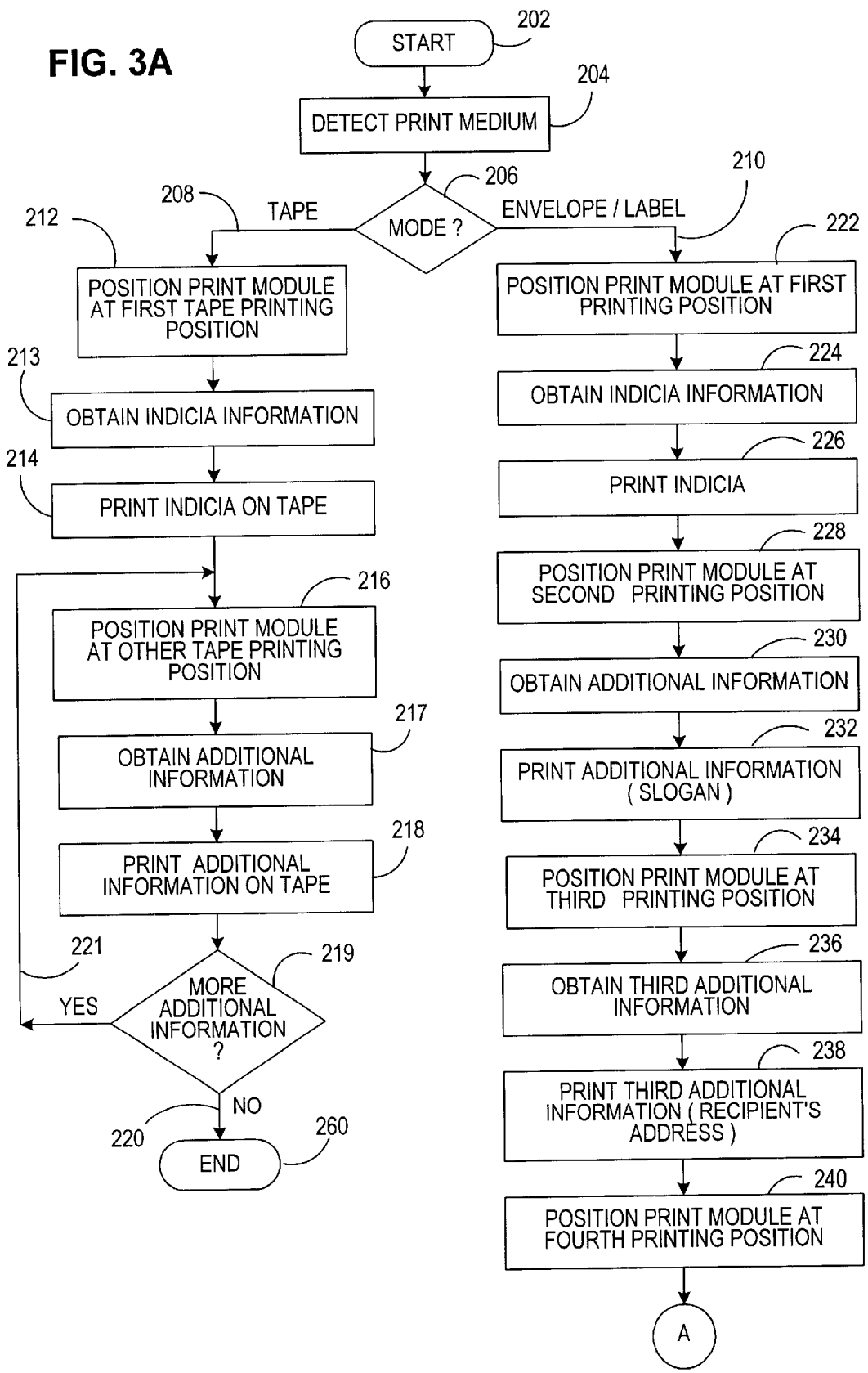
FIGS. 3A and 3B show a flowchart of steps to implement one embodiment of the present invention.
Figure 3B:
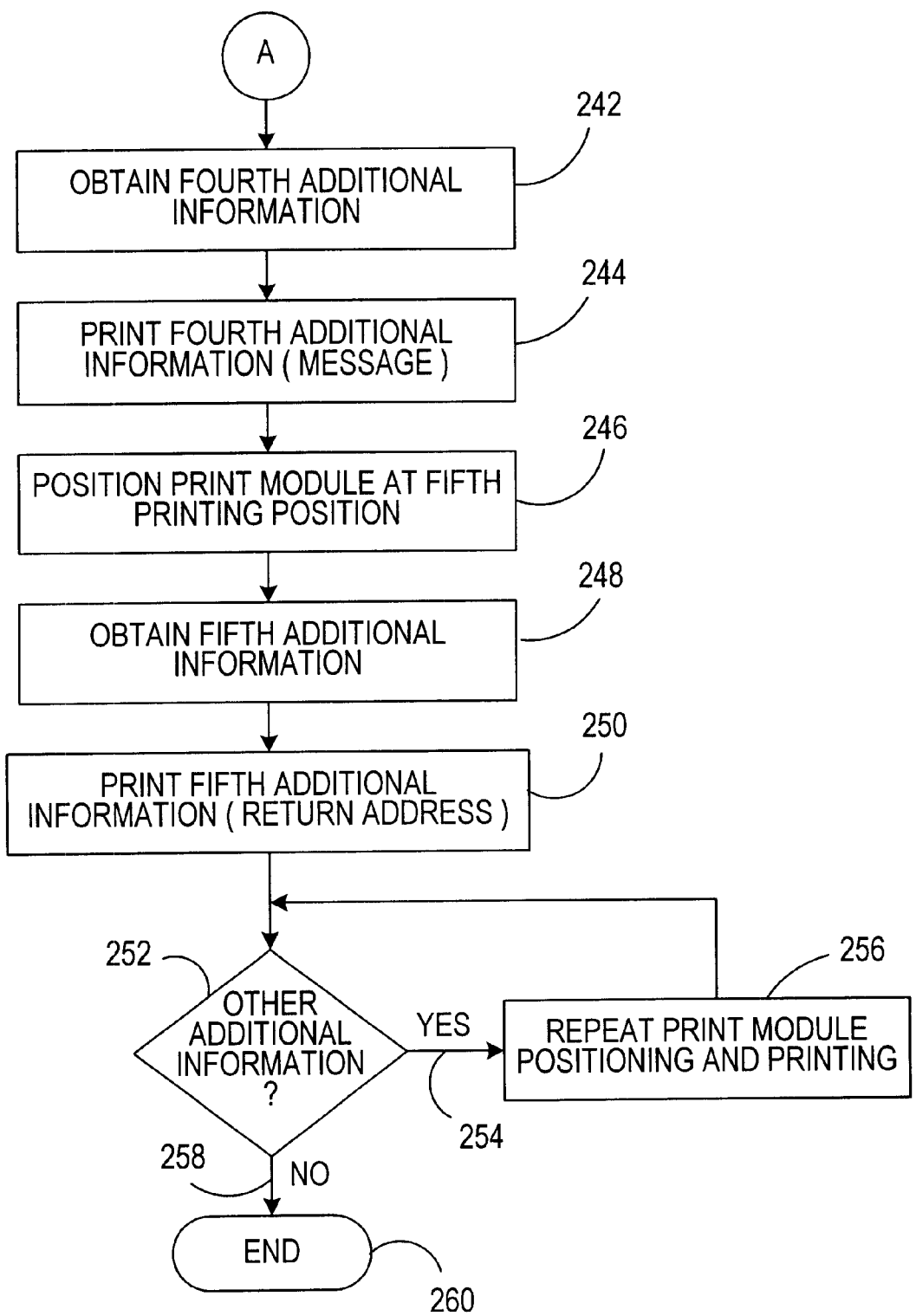

FIG. 3 shows a flowchart 20 of steps used to implement one embodiment of the present invention. These steps are suitably stored on a computer readable medium, such as a floppy diskette, CD ROM, ROM, RAM or PROM. Block 202 is a start block. In block 204, the print medium is detected. The print medium is for example, an envelope, postcard, mailing label or tape, on which information is printed. Block 206 is a decision block that determines which mode the apparatus should operate. If a tape is detected, line 208 leads to block 212 in which the print module is positioned at a first tape printing position. This is typically accomplished by the tape medium being passed through the print module and the print module moves from the maintenance position to a position suitable for printing on a tape. Block 213 shows that indicia information is obtained. This can be accomplished by retrieving the indicia data from memory or a user inputting the information from a user interface. Block 214 shows that postal indicia is then printed on the tape at a first area of the tape. After the postal indicia is printed on the tape, the print module is moved to another position, as shown in block 216. Additional information is obtained, either from memory or user input, as shown in block 217. Block 218 shows that additional information is printed on the tape. This additional information typically includes any combination of slogan information such as "conserve energy" or "don't smoke", temporary address information, mail stop information, forwarding address information, postal rate information, date information, licensing information, inadequate postage information, the time the medium was printed, contact information that a persons, should be notified when the article is received, further delivery instructions, change of address and forwarding address information, and the like. The print module can be further positioned to print more additional information on the tape. Block 219 determines whether there is more additional information. If so, line 221 leads to block 216. When there is no more information to be printed, line 220 leads to end block 260.

If an envelopes or label is detected in block 206, line 210 leads to block 222 in which the print module is positioned at a first printing position. In block 224, postal indicia information is obtained. A postal indicia is printed on the envelope as shown in block 226. This is typically at a specified area of the medium to comply with U.S. Post Office regulations. Block to 228 shows that the print module is moved to a second area of the medium and block 230 shows additional data, such as slogan information is obtained, either from memory or a user interface. In block 232, the additional (slogan) information is printed. In block 234 the print module is moved to a third area of the medium and block 236 shows that second additional data, such as a recipient's address is obtained, either from memory or a user interface. In block 238, the second additional (recipient's address) information is printed. Blocks 240, 242, 244, 246, 248 and 250 show that the process is repeated to print still more information on the medium. Block 252 determines whether or not the printing procedure is complete. If more information is to be printed, line 254 leads to block 256, which shows the process is repeated. When there is no more information, line 258 leads to end block 260.

Figure 4:
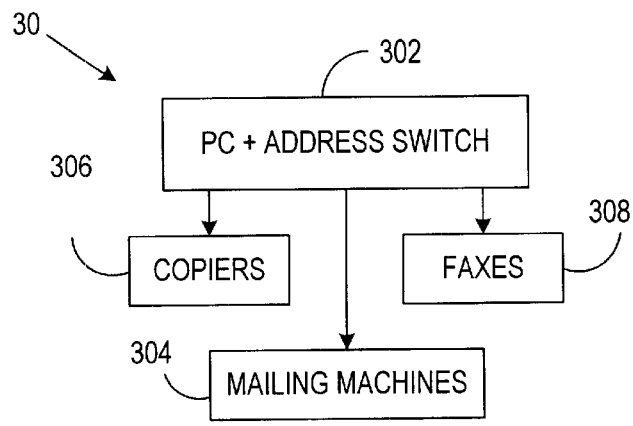
FIG. 4 shows that the present invention can be utilized with mailing machines, copier machines and facsimile machines.

FIG. 4 shows that multiple devices can be driven by a central unit. The central unit with address software is indicated as block 302. This unit typically includes a processing unit and memory. The processing unit is any suitable processor, such as a 486 or greater, available from Intel. The memory is suitably any adequate memory for storing the information. The address software can be downloaded to a mailing machine, shown as block 304, a copier machine, shown as block 306, or a facsimile machine, shown as block 308.

Figure 5:
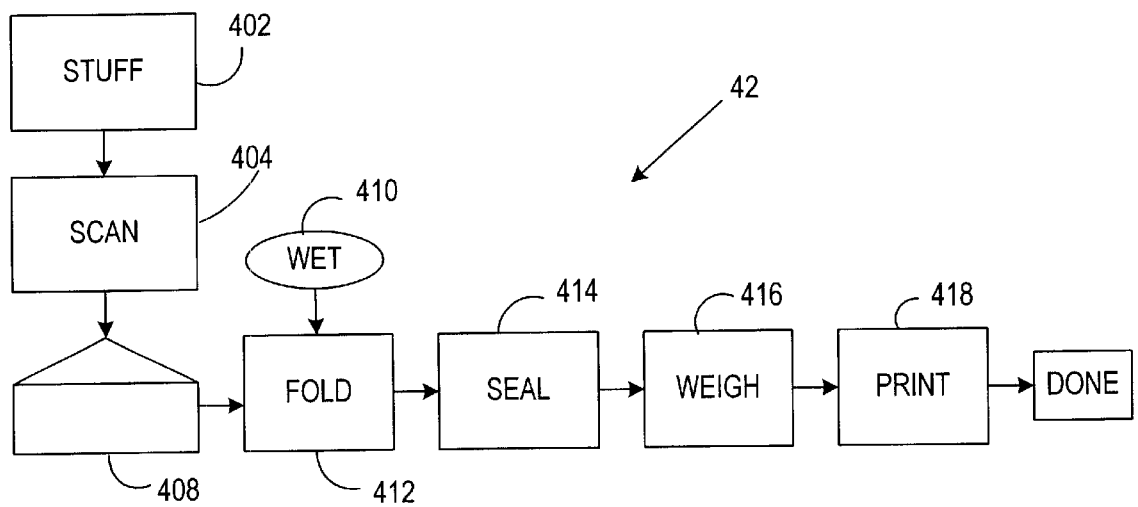
FIG. 5 is block diagram of a second embodiment of the present invention.

FIG. 5 shows a second embodiment 42 of the present invention. Start block 402 indicates that mailing medium is stuffed with material to be mailed to a receiver location. Block 404 shows that the mailing medium is scanned. Block 408 shows that the mail piece can be folded or otherwise processed. Block 410 shows that the mailing media has moisture applied to it so that an adhesive portion will adhere to a second portion of the mailing medium. Block 412 shows that the mailing medium is folded in such a way as to enable mailing through the U.S.P.S. Block 414 shows the sealing process. Block 416 shows that the mailing medium with the materials to be sent to the recipient is weighed. Block 418 shows the printing, which is performed by the apparatus described herein. This printing includes controlling the print module so that postal indicia is printed when the print module is in a first position and additional information is printed while the print module is in a second position. The print module can be positioned so as to print recipient data and sender data as well. After the printing is complete, the sealed mailing material is placed in a dispatch bin for delivery.

Figure 6:
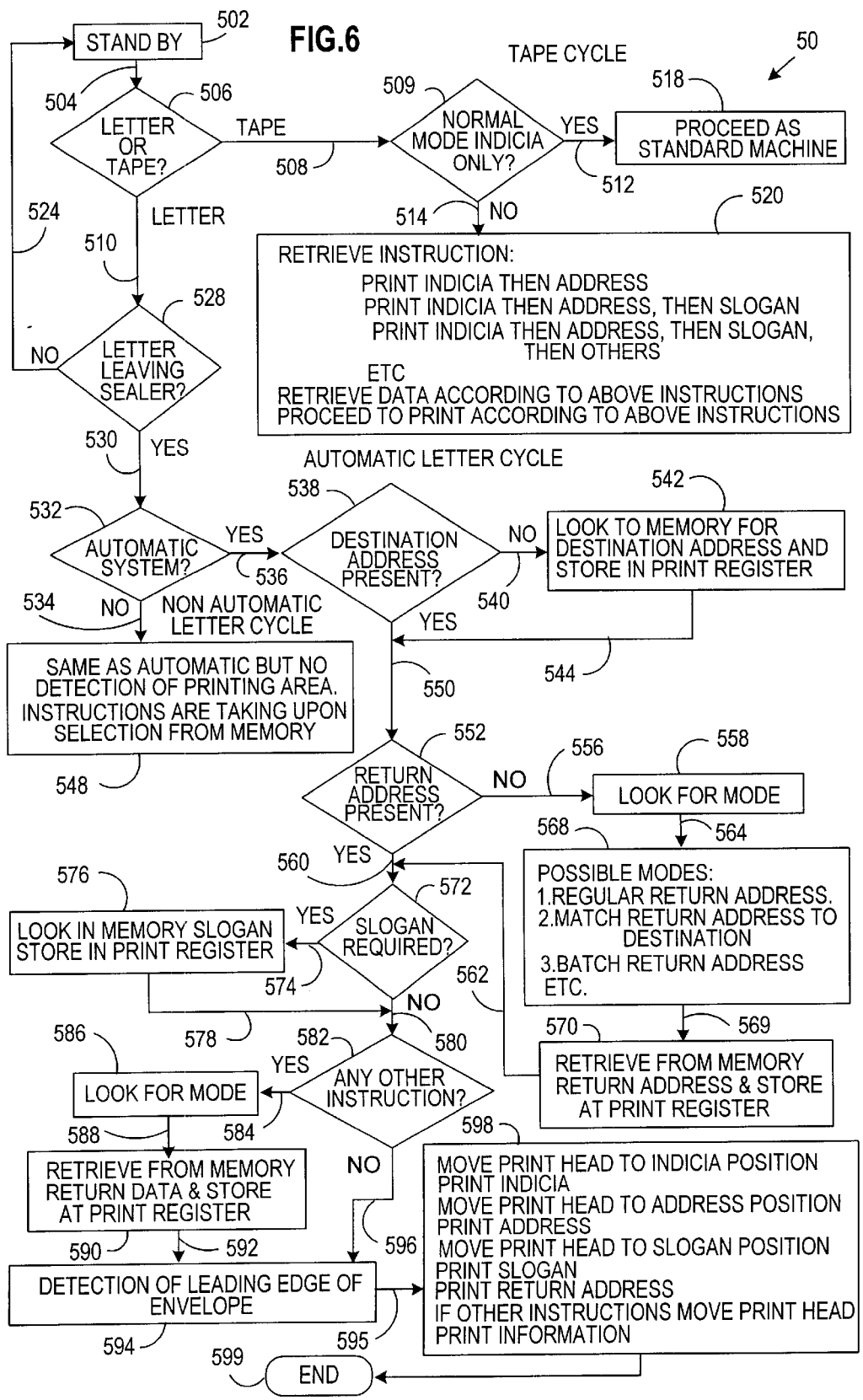
FIG. 6 is flowchart of steps to implement a third embodiment of the present invention.

FIG. 6 shows a flowchart 50 of another embodiment of the present invention, which is suitably stored on a computer readable medium, such as a diskette, CDROM, ROM, PROM. The steps are also suitably stored at a server location and downloaded via an interconnection, such as the Internet, to a remote terminal. As shown by the steps 50, block 502 is a stand-by block in which the apparatus is in a power conserving or sleep mode. Line 504 connects block 502 to decision block 506, which determines whether an envelope or a tape medium, or a label or postcard is to be printed on. If a medium other then an envelope, i.e., tape, postcard or label, is established, line 508 leads to block 509 in which indicia is determined or additional processing is determined. This information is retrieved from an associated database, which stores, for example, postal rate information, recipient address information, sender address information and slogan information. If postal indicia is the only information to be printed, line 512 lead to block 518 which is a conventional processing procedure, which enables a print module to print indicia on the medium (e.g., tape, postcard or label).

If there is additional information other than the indicia, line 514 leads to block 520 in which the print module is controlled such that indicia is printed on a first area of the tape, then the print module is positioned in another position such that additional information, such as slogan information is printed on a second area of the medium. The print module can then be positioned in yet another position and still other information can be printed. This may include destination address information. The actual content of the additional information is a function of what is stored in memory and can include virtually any information such as temporary address information, mail stop information, forwarding address information, postal rate information, date information, licensing information, inadequate postage information and other information that is desired. Sender address information can also be printed either in a designated area of the envelope or on the reverse side of the envelope.

If decision block 506 determines that an envelope is to be printed, line 510 leads to block 528 which determines whether there is a letter leaving the sealer apparatus. If not, line 524 leads to back to stand-by block 502. If a letter is leaving the sealer, line 530 leads to block 532, which determines whether or not there is an automated system. If not, line 534 leads to block 548 which shows that there is no detection of a printing area and the instructions are taken upon selection from memory.

If block 532 determines there is an automatic system, line 536 leads to decision block 538 which determines whether there is a destination address present. If not, line 540 leads to block 542 in which memory is examined for destination address data. If destination address data is found, such information is stored in a printer register. Line 544 connects to line 550, which leads to block 552, which enables the system to determine whether return address information is present. If not, line 556 leads to block 558, which shows that the mode is determined. Line 564 leads to block 568 in which various possible modes are established. One possible mode is a regular return address. A second possible mode is to match the return address to a destination. A third possible mode is a batch return address. Line 569 leads to block 570, which retrieves from memory return address information and stores such information at a print register. Once the return address has been established line 562 intersects with line 560.

Line 560 leads to block 572, which determines whether or not there is a slogan required. If yes, line 574 leads to block 576 in which memory is examined for slogan information that is stored in a print register. Line 578 intersects with line 580 to decision block 582 to determine whether there are any other instructions. If yes, line 584 leads to block 586 in which the return data is retrieved from memory. Line 592 leads to block 594 in which detection of a leaving edge of an envelope is established.

If in block 582, it is determined that there are not other instructions, line 596 leads to block 594. From block 594, line 595 leads to block 598 in which the print module is moved from a maintenance position to a first envelope printing position to print postal indicia information on a first area of the envelope. The print module is then positioned at a second envelope printing position to print additional information, such as the address information, on a second area of the envelope. Next the print module is positioned at a third position to print more information, such as slogan information, on a third area of the envelope. Block 599 is an end block.

In another embodiment, a second print module can be positioned so that information is printed on the reverse side of the envelope. This merely requires controlling the second print module to print while the envelope is passing through a path of a mailing machine.

Figure 7:
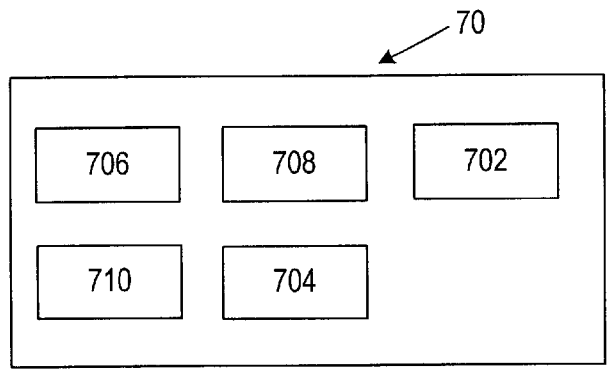
FIG. 7 shows a label with postal indicia and additional information printed thereon.

FIG. 7 shows a portion of tape, or label or other medium with an adhesive surface 70 that has been printed. Area 702 represents an area upon which the postal indicia is printed. This indicia can include secure and non-secure information, and the print module can multiples between the printing of secure and non-secure information. The secure information can include encrypted information or bar code information or any combination thereof. Area 708 represents an area of the tape upon which slogan information is printed. Area 704 represents an area upon which a recipient's address is printed. Area 710 represents an area upon which can be printed additional information such as license agreement information, time stamp, etc. Area 706 represents an area upon which receiver address information can be printed.

Figure 8A:
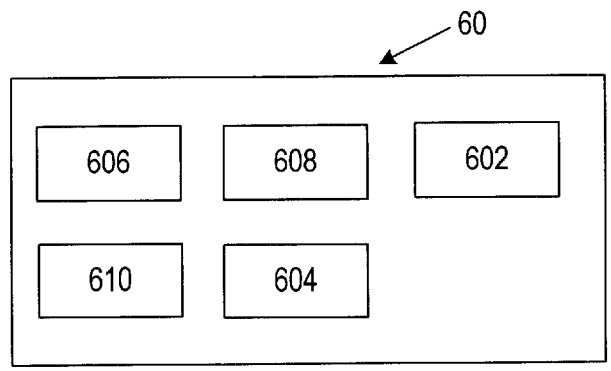
FIGS. 8A and 8B show a mailing medium according to the present invention.
Figure 8B:
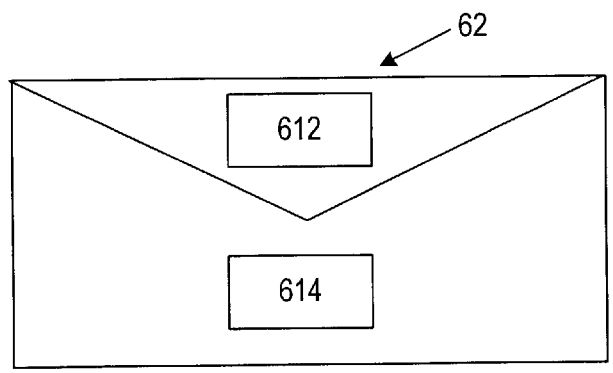

FIGS. 8A and 8B show various portions of a mailing material, specifically an envelope. FIG. 8A shows a front side 60 with indicia area 602, recipients address area 604, sender's address area 606 and slogan information area 608. There are also other areas such as 610 that can be used to print information such as a change of address, license information, etc. These described areas are printed by changing the position of a print module so that each area is printed while the print module is in a specified position while the envelope is passed through the print module. The information can input from a user interface or down-loaded from an associated memory. Also, a user can supply the information on a CDROM, diskette, or website.

FIG. 8B shows an opposite side 62 of the envelope in which additional information can be printed in area 614 and a return address information can be printed in area 612. This is accomplished by positioning a second print module such that the information can be printed on the reverse side while the envelope is passing through the print module.

Figure 9:
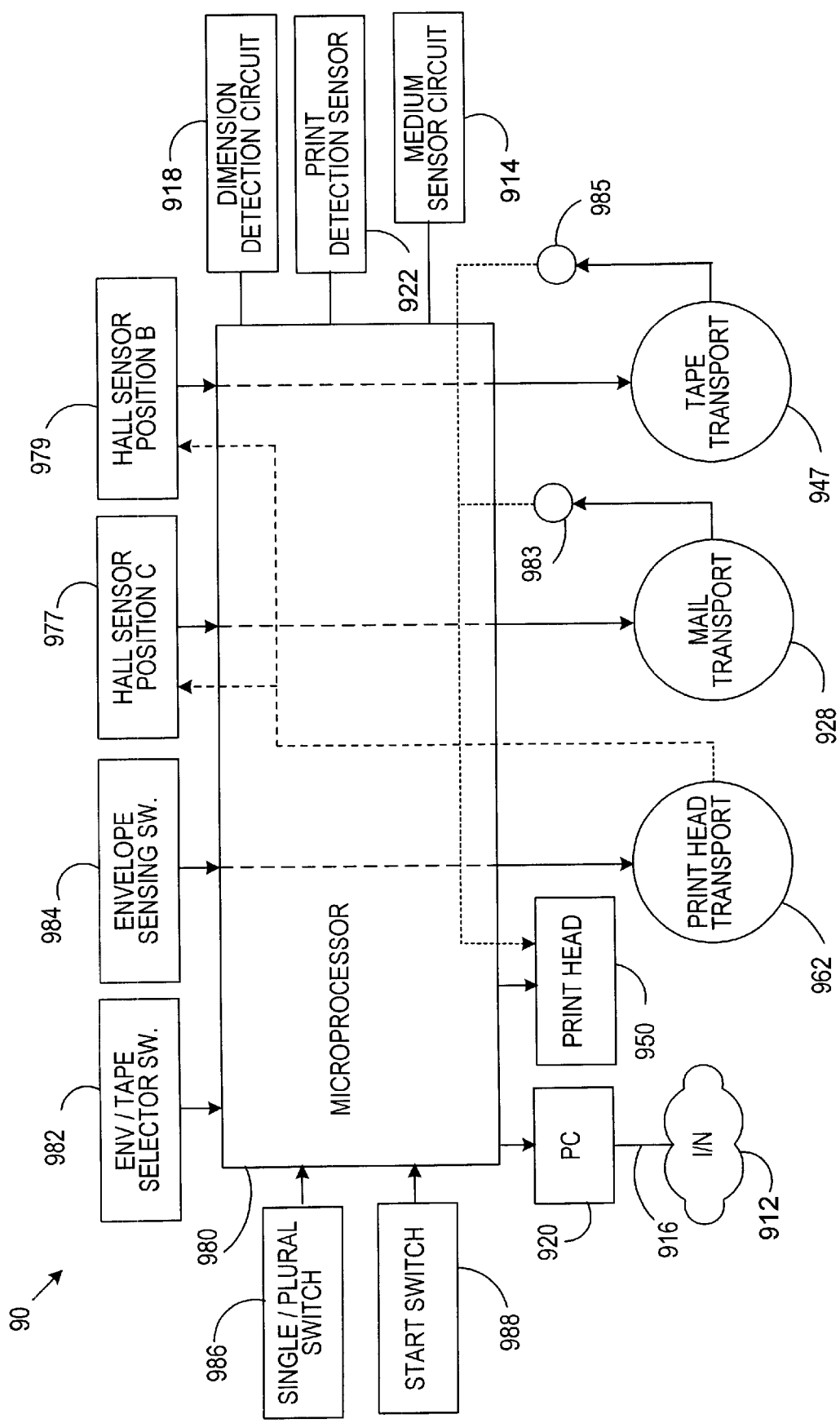
FIG. 9 shows a block diagram of a mailing machine that uses the present invention.

FIG. 9 illustrates a representative simplified form of electrical and electronic control system for a mailing machine 90. A microprocessor 980 is provided which controls the principal operational features of the mailing machine 90. An envelope/tape selector switch 982 is provide on a control panel for the mailing machine 90 and functions to set the microprocessor 980 in an envelope or tape printing mode. A sensor switch 984 is mounted in the path of an incoming envelope and functions to cause the microprocessor 980 to commence a cycle of operation of the mailing machine 90.

If a user wishes to print a postage indicia directly on envelopes, he/she activates the envelope/tape control switch 982 to select the envelope-printing mode. When an envelope is inserted into the mailing machine, either manually or by an automatic feeding device, it contacts the sensing switch 984 which activates the microprocessor 980 to emerge the motor 962 to move the printing module 950 from the maintenance position to the first printing position so that it will print the postage indicia directly on the envelope. When the printing module 950 reaches the printing position, as determined by the Hall sensor 977, the microprocessor 980 then energizes the motor 928 to move a belt (not shown) to feed the envelope. During the movement, a suitable position monitoring device, such as the optical encoder 983 coupled to the drive motor 928 for the belt, monitors the movement of the envelope along the feed path.

When the encoder 983 determines that the envelope is in the proper position to receive the postage indicia, the microprocessor 980 causes the printing module 950 to commence, the printing operation. The encoder 983, through the microprocessor 980, controls the operation of the ink ejection devices in the printing module 950 for each of the nozzles to ensure the printing of a high quality postage indicia in a first area of the envelope. When the indicia is fully printed, the print module 950 is moved into a second position to print other information, such as slogan information, in a second area of the envelope. When the slogan information is fully printed, the print module 950 is moved into a third position to print still other information, such as recipient's address information, in a fourth area of the envelope. Next the print module 950 can be positioned in a fifth position to print yet more information, such as sender address information, on a fifth area of the envelope. When the print module 950 has completed all printing operations, the microprocessor 980 terminates printing operation of the mailing machine 90 and the belt ejects the envelope from the mailing machine 90. If no further envelopes are to be printed, the microprocessor 980 again energizes the motor 962 to cause the printing motor 950 to return to the maintenance position.

If, on the other hand, successive envelopes are fed into the mailing machine 90, either manually or by means of an automatic feeder, the above cycle simply repeats for each successive envelope, at the end of which the microprocessor 980 energizes the motor 962 to return the printing module 950 to the maintenance position. It should be understood, however, that the microprocessor 980 can be set to stop the operation of the feed belt after any predetermined number of printing operations, and to cause the printing module 950 to return momentarily to the maintenance position to permit the nozzle plate to be cleaned.

If the user has an envelope which, for one reason or another, cannot be fed through the mailing machine 90, he/she again presses the envelope/tape selector switch 982 to select the tape printing mode, and also activates the single/multiple printing switch 986 to select between a single printing operation or some plurality thereof. He/she then presses the start button 988, which causes the micropocessor 980 to energize the motor 962 to move the printing module 950 to the printing position, which is different than the maintenance position. When the printing module 950 reaches this position, as determined by the Hall sensor 979, the microprocessor 980 activates the motor 947 to drive the feed rollers, so as to move a section of the tape beneath the printing module 950, during which another encoder 985, connected to the drive roller of the tape drive monitors the movement of the tape along its feed path.

When the encoder 985 determines that a prescribed section of tape is in the proper position to receive the postage indicia, the microprocessor 980 causes the printing module 950 to cycle through a printing operation in the same manner as that described above for printing the postage indicia on an envelope, with the encoder 985, through the microprocessor 980, controlling the operation of the ink ejection devices to ensure the printing of a high quality postage indicia, again the same as described above for printing on an envelope. The printer module 950 can be positioned to print additional information such as slogan information. When the printing operation is complete, the microprocessor 980 terminates operation of the printing module 950, activates an appropriate severing device (not shown) and causes the rollers to eject the severed strip of tape from the mailing machine. The microprocessor then activates the motor 962 to return the printing module 950 to the maintenance position, unless the operator has activated the single/multiple switch 986 to select the multiple print mode, in which case the microprocessor 980 will permit the printing module 950 to repeat the printing operation a predetermined number of times before it is automatically returned to the maintenance position. A print detection circuit 922 detects print material that is on the mailing medium, i.e., envelope, tape, postcard or label. The detection circuit 922 provides that information to the printhead transport 932 to control the print module 950. Thus, if the mailing medium has for example, a barcode, a transparent window, or return address data printed thereon, the print module 950 will not print in that area of the medium that is not available to be printed on. Dimension detection circuit 918 is coupled to microprocessor 980 and detects the dimensions of the medium to be printed on. The dimension detection circuit 918 can )e, for example, one or more photocells that determine the size of the mailing medium, can detect whether a #10 business envelope, BRE (business reply envelope), envelope with transparent window, postcard, or mailing label is to be printed.

It is an embodiment of the present invention that the PC 920, microprocessor 980 and printhead 950 can operate as a printing terminal that prints information retrieved from remote locations with the Internet 912. In this manner, conventional mail meter components are not necessary. The PC 920 is typically connected to network 912, which is any network of computers, such as the Internet. Internet service is provided via interconnection 916 through a service provider (ISP or IAP).

The combination of the print detection module 922 and the dimension detection module 918 enable the mailing machine 90 to output an appropriately printed medium based on the dimensions of the medium and any data or other aspects of the medium i.e., window in envelope that affect available surface area of the envelope.

The apparatus for printing on a medium can comprise various functional capabilities. For example, means for detecting a type of medium include photocells, medium detection circuit and any circuitry that detects whether the type of envelope or tape is to be printed on. Means for positioning a print module at a particular position include the control circuitry connected to the print module. This control function can also be accomplished by a microprocessor, as shown herein or other processing arrangement. Means for printing postal indicia data include a print module, inkjet printhead, laser or LED printhead or any suitable apparatus that prints ink or a bar code on a medium. Means for obtaining data include for example, a processor retrieving data from a memory location or other PC or microprocessor that interfaces with a memory or storage location.

A personal computer (PC), such as a laptop or desktop computer, 920 can be operatively connected to microprocessor 980. The PC 920 may be, for example, a commercially available general purpose computer such as a windows-type or MacIntosh-type computer, equipped with a desktop browser that enables the user to "surf the Net". The PC 920 may also include a display device for example a monitor, which is suitably a cathode ray tube (CRT) display, or a liquid crystal (LCD) screen; data processor; input device 118; and other peripheral devices. The CRT device provides a screen to display data to an operator. The input device, which is typically a keyboard and/or a mouse enables the operator to enter data. The processor has memory, such as a RAM or ROM, and adequate speed to store and retrieve data. Typically a Pentium III processor is preferred; but the processor capacity depends on the quantity of data to be stored and accessed. The PC 920 can control the printhead 950 so that the printhead 950 prints on the medium according to instructions retrieved from the PC 920. PC 920 stores information such as postal regulations and requirements. This information can be downloaded from the U.S. Postal Service website over the Internet and stored on PC 920. The PC 920 can be programmed to retrieve information from the Postal Service website at predetermined time intervals, such as once a day, thereby ensuring that the data downloaded to printhead 950 is current with the latest U.S. Postal Service regulations. This embodiment obviates the need for a vault, gate keeper, user interface and sophisticated printing mechanism, which greatly simplifies the mailing machine since the print module is controlled by the PC. When the apparatus described herein is in operation, the mailing medium is moving through the machine. Thus, the print head moves from a maintenance position to a first position. This first position is typically such that indicia and additional information such as slogan information, postage rate information and the like are printed on the medium. The print head is then moved to a second position. In this position recipient address information is printed. Also, other additional information, such as other slogans or the like can be printed since the medium is moving through the apparatus. The printhead can then be moved into the first position to print other information it a different area of the medium.

The present invention has been described in terms of printing on envelopes, tapes and labels. Typically the mailing labels have a surface with an adhesive. The labels are typically mailing labels with dimensions such as 3 inches×5 inches, 4 inches×6 inches or 8 inches×10 inches, or any suitable size. The postal indicia, slogan information, recipient's address, other slogan information and sender's address can be printed on the label if size permits. The tape dimensions can also vary, and the larger the tape, the more information that can be printed thereon.

While the present invention has been disclosed and described with reference to specific embodiments, it will be apparent, as noted above that variations and modifications may be made therein.

What is claimed is:

1. A method of printing on a medium comprising the steps of:
   detecting a type of medium;
   entering a printing mode as a function of the type of medium detected in the detecting step, the printing mode being either an envelope printing mode or a tape printing mode,
   when in the envelope printing mode:
      positioning a print module at a first position;
      printing postal indicia data on a first area of the envelope;
      positioning the print module at a second position;
      obtaining additional data;
      printing the additional data on a second area of the envelope;
      positioning the print module at the first position;
      obtaining recipient address data; and printing the recipient address data on a third area of the envelope;

positioning the print module at a third position;

obtaining sender address information; and printing the sender address information on a fourth area of the envelope.

2. The method of claim 1, further comprising:

when in the tape printing mode:

positioning the print module at a fourth position; and printing indicia on a first portion of the tape.

3. The method of claim 2, further comprising:

positioning the print module at a fifth position;

obtaining additional tape information; and printing the additional tape information on a second portion of the tape.

4. A method of printing on an envelope comprising the steps of:

a first positioning step of positioning a print module at a first position;

a first printing step of printing postal indicia information on a first area of the envelope wherein the postal indicia information includes postal rate information, a second positioning step of positioning the print module at a second position; and a second printing step of printing a second type of information on a second area of the envelope.

5. The method according to claim 4, further comprising:

a third positioning step of positioning the print module at a third position; and a third printing step of printing a third type of information on a third area of the envelope.

6. The method according to claim 5, further comprising:

a fourth positioning step of positioning the print module at a fourth position; and a fourth printing step of printing a fourth type of information at a fourth area of the envelope.

7. The method according to claim 6, further comprising receiving the information to be printed on the envelope from a user interface.

8. The method according to claim 6, further comprising grouping information to be printed in a batch format.

9. The method according to claim 6, further comprising, obtaining at least a portion of the information to be printed on the envelope from a memory medium provided by a user.

10. The method according to claim 6, further comprising retrieving the information to be printed on the envelope from a memory location.

11. The method according to claim 4, further comprising multiplexing between printing secure and non-secure information.

12. The method of claim 4, wherein the second printing step of printing comprises printing change of address information.

13. The method of claim 4, wherein the second printing step comprises printing slogan information.

14. The method of claim 4, wherein the second printing step comprises printing temporary address information.

15. The method of claim 4, wherein the second printing step comprises printing mail stop information.

16. The method of claim 4, wherein the second step of printing comprises printing contact information.

17. The method of claim 4, wherein the second step of printing comprises printing advertisement information.

18. The method of claim 4, wherein the second step of printing comprises printing time data.

19. The method of claim 4, wherein the second step of printing comprises printing a message that additional postage is required.

20. The method of claim 4, wherein the second step of printing comprises printing license information.

21. The method of claim 4, wherein the first step of printing indicia includes printing secure information.

22. The method of claim 4, further comprising:

positioning a second print module on an opposite side of the envelope from the first position; and printing information on the opposite side of the envelope.

23. The method of claim 4, further comprising:

a tape positioning step of positioning the print module at a tape-printing position and printing indicia on a tape.

24. The method according to claim 23, further comprising:

a second tape positioning step of positioning the print module at a second-tape printing position; and printing additional data on the tape.

25. The method according to claim 24, further comprising:

a third-tape positioning step of positioning the print module at a third tape printing position; and printing return address data on the tape.

26. An apparatus for printing on an envelope comprising:

means for positioning a print module at a first position;

means for printing postal indicia information on a first area of the envelope wherein the postal indicia information includes postal rate information;

means for positioning the print module at a second position and means for printing a second type of information on a second area of the envelope.

27. The apparatus according to claim 26, further comprising:

means for positioning the print module at a third position; and means for printing a third type of information on a third area of the envelope.

28. The apparatus according to claim 27, further comprising:

means for positioning the print module at a fourth position; and means for printing a fourth type of information at a fourth area of the envelope.

29. The apparatus according to claim 26, further comprising means for receiving the information to be printed on the envelope from a user interface.

30. The apparatus according to claim 26, further comprising, means for obtaining at least a portion of the information to be printed on the envelope from a memory medium provided by a user.

31. The apparatus according to claim 26, further comprising means for multiplexing between printing secure and non-secure information.

32. The apparatus according to claim 26, further comprising:
    means for positioning a second print module on an opposite side of the envelope from the first position; and
    means for printing information on the opposite side of the envelope.

33. The apparatus of claim 26, further comprising:
    means for positioning the print module at a tape-printing position and
    means for printing indicia on a tape.

34. The apparatus according to claim 33, further comprising:
    means for positioning the print module at a second-tape printing position; and
    means for printing additional data on the tape.

35. The apparatus according to claim 34, further comprising:
    means for positioning the print module at a third tape printing position; and
    means for printing other data on the tape.

* * * * *